United States Patent [19]

Razzano

[11] 3,846,464

[45] Nov. 5, 1974

[54] PROCESS FOR PREPARING CYCLIC METHYLVINYLSILOXANES

[75] Inventor: John S. Razzano, Troy, N.Y.

[73] Assignee: General Electric Company, Waterford, N.Y.

[22] Filed: Nov. 27, 1973

[21] Appl. No.: 419,373

[52] U.S. Cl. .......................... 260/448.2 E
[51] Int. Cl. ................................ C07f 7/08
[58] Field of Search ...................... 260/448.2 E

[56] References Cited
UNITED STATES PATENTS

| | | | |
|---|---|---|---|
| 3,504,006 | 3/1970 | Modic | 260/448.2 E |
| 3,558,681 | 1/1971 | Kuznetsova et al. | 260/448.2 E |
| 3,590,064 | 6/1971 | Lacefield | 260/448.2 E |
| 3,607,898 | 9/1971 | Macher | 260/448.2 E |
| 3,763,212 | 10/1973 | McEntee et al. | 260/448.2 E |

Primary Examiner—Daniel E. Wyman
Assistant Examiner—Paul F. Shaver
Attorney, Agent, or Firm—Granville M. Pine; Edward A. Hedman; Donald J. Voss

[57] ABSTRACT

Cyclic sym-tetramethyltetravinyltetrasiloxane is prepared by cracking a methylvinylpolysiloxane hydrolysis product in admixture with an excess of a high boiling hydrocarbon solvent using heat and potassium hydroxide as the catalyst. The process provides high yields without the need for expensive catalysts and solvents and potentially hazardous reaction conditions.

8 Claims, No Drawings

PROCESS FOR PREPARING CYCLIC METHYLVINYLSILOXANES

The present invention relates to an improved process to make methylvinylcyclicpolysiloxanes. More particularly, it is concerned with the preparation of sym-tetramethyltetravinylcyclotetrasiloxane by cracking a hydrolysis product of a methylvinylsiloxane compound in admixture with a high boiling hydrocarbon solvent using heat and potassium hydroxide as a catalyst.

BACKGROUND OF THE INVENTION

The presence of vinyl groups as substituents along the siloxane polymer chain is very important to the curing of silicone elastomers. This is true whether the elastomer is peroxide cured or whether the cure is a platinum catalyzed reaction between a siliconhydride cross linker and the vinyl groups. In general, the concentration of vinyl groups in a silicone polymer is low — less than 1 mole % methylvinylsiloxy — and the usual method of incorporating vinyl groups is by copolymerization of sym-tetramethyltetravinylcyclotetrasiloxane with octamethylcyclotetrasiloxane.

Processes used heretofore for the preparation of sym-tetramethyltetravinylcyclotetrasiloxane up until now have had several disadvantages, resulting in low yields, high expense and potential hazards. For example, one such method involves the hydrolysis of methylvinyldichlorosilane in a mixture of a polar solvent and water to yield methylvinyl mixed cyclicpolysiloxanes from which the tetramer fraction is distilled. This process provides only a 50 percent yield of tetramer from available siloxanes. Cracking methods are described in Fletcher, U.S. Pat. No. 2,860,152, and in Macher, U.S. Pat. No. 3,607,898, the latter being assigned to the assignee of the present application and incorporated herein by reference. In the Fletcher patent cyclic cracking is carried out in high boiling solvents using alkali metal hydroxides or alkali metal silanolates as catalysts. The ratio of solvent to the cyclics is said to range upwardly from 20 percent to no upper limit, preferably from 35 to 60 percent, and all of the working examples use a greater amount of cyclics than solvent. The process described in this patent does not work at all well with methylvinyl hydrolyzates because they tend to gel, apparently because of the presence of vinyltrichlorosilane hydrolysis products. In the Macher patent, a methyl-vinyl hydrolyzate is efficiently cracked in a solvent-catalyst mixture in which the solvent component appears to act as a cocatalyst with lithium hydroxide. While good yields (75–80 percent) can be obtained, there are disadvantages. For example, lithium hydroxide is very expensive — of the order of $10.00 per pound. Moreover, the solvent-cocatalyst, e.g., glycol ethers or triphenyl phosphine oxide, are also expensive and with the former, especially, there is a tendency for oxidation at high reaction temperature to from potentially hazardous peroxides.

An improved cracking procedure has now been discovered which provides high yields, of the order of 80–90 percent, of cyclicsiloxanes, while using low-cost and safe high boiling hydrocarbon solvents and an inexpensive cracking catalyst, potassium hydroxide. It is essential to use a substantial excess of the solvent with respect to the hydrolyzate starting material. This is surprising in view of the teachings of the Fletcher patent. Moreover, it is surprising to find that potassium hydroxide will function because screening experiments disclosed in the Macher patent (Examples 5–11) indicated that mixtures of barium hydroxide and potassium hydroxide caused cleavage of the products and gellation of the distillation pot contents; and that even with hexamethylphosphoramide as a cocatalyst, 1 percent of potassium hydroxide caused the pot contents to gel. The Macher patent does not disclose what would happen with potassium hydroxide alone as a catalyst or if the hydrolysis product in admixture with a high boiling hydrocarbon solvent is cracked with potassium hydroxide. The Macher patent does disclose that with lithium hydroxide alone, no useful results were obtained.

DESCRIPTION OF THE INVENTION

According to the present invention, there is provided a process for the preparation of sym-tetramethyltetravinylcyclotetrasiloxane comprising heating a methylvinylpolysiloxane material in admixture with a high boiling hydrocarbon solvent in the presence of an effective, catalytic amount of potassium hydroxide. The heating should be sufficient to rearrange the polysiloxanes into cyclic-sym-polymethyl, polyvinylcyclopolysiloxanes, primarily the cyclic tetrasiloxane; and these are then distilled from the heated mixture.

Essentially, when employing the high boiling hydrocarbon solvent, preferably a mineral oil, in conjunction with potassium hydroxide, the mixture in the distillation chamber must contain at least about two parts of the solvent for each part of the polysiloxane hydrolysis product. Except as limited by problems of equipment utilization, there is no upper limit to the amount of solvent which can be employed in conjunction with the organopolysiloxane hydrolysis product, although exceptionally good results are obtained with between 3 and 5 parts of high boiling hydrocarbon solvent per part of hydrolysis product. The most preferred ratio of materials is about 3 parts, by weight, of the high boiling hydrocarbon solvent for each part, by weight, of the organopolysiloxane hydrolysis product. Potassium hydroxide is employed in effective, catalytic amounts. Illustratively, it will range from about 0.1 and 10 percent, preferably from 0.5 to 5 percent, and especially preferably, from about 2 to 4 percent, by weight, based on the hydrolysis product.

The nature of the high boiling hydrocarbon solvent used in the distillation vessel along with the organopolysiloxane hydrolysis product can vary widely. It can be aliphatic, aromatic, cyclic, straight chain or the like. Preferably, it will be a mineral oil. The volatility of the hydrocarbon solvent will preferably be less than 0.5 percent weight loss after 3 hours at 325°F. Among the solvents which can be used are those sold under the trade names Nujol, Primol D, Bayol 35, Bayol 90 and Flexon 845. Nujol, a high molecular weight white mineral oil, is an essentially paraffinic material with a viscosity, at 100°F., of 360–390 Saybolt seconds, and a specific gravity at 60°F. of 0.880–0.900. Primol D, also a high molecular weight white mineral oil, contains approximately 36 percent naphthenes and 64 percent paraffins and has a viscosity of 369 Saybolt seconds, at 100°F. and 54.2 Saybolt seconds at 210°F. with a specific gravity of about 0.8836 at 60°F. Bayol 35, a refined kerosene, is composed of approximately 3 percent aromatics, 29 percent naphthenes, 66 percent paraffins, and 2 percent olefins, and has a viscosity of 35

Saybolt seconds at 100°F. and a specific gravity of about 0.780 at 60°F. Bayol 90, a medium molecular weight white mineral oil, with a viscosity of 87 Saybolt seconds at 100°F. and 38 Saybolt seconds at 210°F., and a specific gravity of about 0.8677 at 60°F., has a composition of approximately 53 percent naphthenes and 47 percent paraffins.

Especially preferred as a solvent is the high boiling hydrocarbon process oil, having a mineral oil base, known as Flexon 845. Flexon 845 has an aromatic carbon content of 2 percent, naphthenic carbon content of 29 percent, and a paraffinic carbon content of 69 percent. The viscosity at 100°F. is 150 Saybolt seconds and the specific gravity at 60°F. is 0.865.

In preparing to carry out the present process, after hydrolysis of the methylvinylsilane, e.g., a mixture of 99 to 95 parts by weight of methylvinyldichlorosilane and from 1 to 5 parts of vinyltrichlorosilane, and prior to its introduction into the distillation vessel, the hydrolysis reaction product is phase separated to remove the organosilicone material from the hydrolysis water. Any acid remaining in the organosilicone material is then neutralized. The resulting hydrolysis water is then stripped from the organosilicone. The resulting hydrolysis product, potassium hydroxide, and high boiling hydrocarbon solvent are then placed into the distillation vessel. The order of addition is immaterial.

In proceeding according to the present invention, in one of its preferred aspects, a solution of potassium hydroxide in methanol is mixed into a mixture of e.g., 3 parts of mineral oil and 1 part of a methylvinyl hydrolyzate, the amount of potassium hydroxide being sufficient, for example, to provide from 2 to 4 percent by weight based on the hydrolyzate. The reaction mixture is warmed, e.g., to about 60°C. and a vacuum is applied to remove the methanol. This appears to provide for conversion of the potassium hydroxide into an active catalyst-potassium silanolate. Although solid potassium hydroxide can be used — it is not preferred because conversion to an active catalyst is slower and the conversion is poor.

Heating of the contents of the distillation vessel is then continued until temperature in the mixture of approximately 150° to 160°C. is achieved. This is the preferred mixture temperature when a vacuum of about 20 mm. is used. The distillation can be run at temperatures varying from 125° to 175°C. and at pressures of from 5 to 20 mm. At the lower temperatures, the distillation rate is lower, and as the higher temperatures are reached, foaming increases to such a degree as to render any higher temperatures impractical.

On attaining the proper pot temperature, the cyclic methylvinylpolysiloxanes are distilled overhead and the amount of the cyclic tetrasiloxane which is obtained in the overhead can be controlled, within limits, by varying the reflux ratio. In a preferred embodiment, additional methylvinyldichlorosilane hydrolyzate can be fed to the distillation pot, as material is distilled overhead, so that the reaction can be run on a continuous basis. It is preferred that the concentration of hydrolyzate in the mixture at all times be maintained at 25 percent by weight or less. Distillation can be continued until such time as the material in the distillation pot begins to increase in viscosity due, in part, to a buildup of impurities which are contained in the hydrolyzate. Such impurities include polysiloxanes formed from organosilicon materials having a single hydrocarbon substituent on each silicon atom.

The reflux ratio during distillation is adjusted so as to maintain a ratio of sym-tetramethyltetravinylcyclotetrasiloxane to sym-trimethyltrivinylcyclotrisiloxane in the distillate of from about 2:1 to 8:1.

The various cyclic methylvinylpolysiloxanes recovered by the rearrangement and distillation are then separated by fractional distillation and the sym-trimethyltrivinylcyclotrisiloxane, sym-pentamethylpentavinylcyclopentasiloxane, and higher cyclics are recycled and added to further hydrolysis runs for rearrangement, redistillation and formation into the desired sym-tetramethyltetravinylcyclotetrasiloxane. Employing these recycles, the yields of the sym-tetramethyltetravinylcyclotetrasiloxane range from about 75 to 90 percent to the original input hydrolysis product.

DESCRIPTION OF THE PREFERRED EMBODIMENTS

The following examples are illustrative of the process of the present invention and should not be considered as limiting in any way the full scope of the invention as covered by the appended claims. All parts in the following examples are by weight.

EXAMPLE 1

Into a distillation pot are placed 100 parts of a hydrolysis product of 98 parts of methylvinyldichlorsilane and 2 parts of vinyltrichlorosilane, 300 parts of high boiling hydrocarbon process oil (Flexon 845), and a solution of 3 parts of potassium hydroxide in 3 parts of methanol. The pressure on the system is reduced to 20 mm. and the distillation pot contents are warmed to 60°C. to distill off the methanol, then the contents are heated to a temperature of about 165°C. When the head temperature in the associated distillation column reaches 120°C., takeoff of the product is begun and a high yield of product is collected, which represents an 87 percent yield, based upon the feed. The product, analyzed by vapor phase chromatography and infrared spectroscopy, is a blend of sym-trimethyltrivinylcyclotrisiloxane, sym-tetramethyltetravinylcyclotetrasiloxane, and sym-pentamethylpentavinylcyclopentasiloxane in a ratio of 1:13:3. The cyclotrisiloxane and cyclopentasiloxane are recycled into later distillations.

EXAMPLE 2

Into a reaction vessel are placed 100 parts of methylvinyldichlorosilane hydrolysis product which, following hydrolysis, has been separated from the water layer, and azeotroped dry. To the hydrolysis product are added 300 parts of mineral oil (Flexon 845) and 3 parts of potassium hydroxide dissolved in 3 parts of methanol. The pressure on the system is reduced to 30 mm. and the contents of the distillation pot is warmed to 45°C. to remove the methanol then heated to 160°C. When reflux is attained, overhead takeoff is begun. Additional hydrolyzate is added to the distillation pot at a rate as overhead is collected at such a rate as to maintain a 25 percent concentration of hydrolyzate in the reaction vessel. The feeding of additional hydrolyzate was continued for 6 hours employing a total of 600 parts of the hydrolyzate; distillation takeoff continues for an additional 1 hour. A quantity of 534 parts of product are collected; this is an 89 percent yield based upon the feed. Analysis of the product shows a mixture of sym-tetramethyltetravinylcyclotetrasiloxane and sym-trimethylvinyltrisiloxane in a ratio of 1:11:3. A portion of this mixture is fractionally distilled and the identity of the products confirmed by chromatographic and spectroscopic analysis.

The procedure of Example 1 is repeated, lowering the amount of solvent down to 100 parts (1:1 hydrolyzate to solvent). As soon as the temperature reaches 140°C. a substantial amount of gel is seen to form.

Thus, the present process is seen to provide sym-tetramethyltetravinylcyclotetrasiloxane from methylvinyldichlorosilane hydrolysis products, or from other sym-methylvinylcyclopolysiloxanes. The rearrangement process of this invention is applicable to the formation of the sym-tetramethyltetravinylcyclotetrasiloxane in high yields from a variety of methylvinylpolysiloxane materials, both cyclic and linear, employing the specified, inexpensive catalyst without any need of a cocatalyst and using an inexpensive solvent.

Obviously, many variations are possible in light of the above discription. The invention is intended to be defined by the appended claims.

I claim:

1. A process for the preparation of sym-tetramethyltetravinylcyclotetrasiloxane comprising the heating of a mixture of 1 part of (i) a hydrolysis product of 99 to 95 parts of methylvinyldichlorosilane and from 1 to 99 parts of vinyltrichlorosilane and (ii) at least 2 parts of a high boiling hydrocarbon solvent in the presence of an effective, catalytic amount of potassium hydroxide.

2. A process as defined in claim 1 wherein said high boiling hydrocarbon solvent is a mineral oil.

3. A process for the preparation of sym-tetramethyltetravinylcyclotetrasiloxane from the hydrolysis product of methyvinyldichlorosiloxane comprising:
   A. forming a mixture comprising
      i. 1 part of the dried hydrolysis product of methylvinyldichlorosilane;
      ii. at least three parts of a high boiling hydrocarbon solvent; and
      iii. from 0.5 to 5 percent by weight of potassium hydroxide, based on (i);
   B. heating the mixture; and
   C. distilling from the heated mixture a blend of sym-methylvinylcyclopolysiloxanes.

4. A process as defined in claim 3 wherein said hydrolysis product (i) is added to the distillation mixture as the cyclic polysiloxanes are removed.

5. A process as defined in claim 3 wherein the high boiling hydrocarbon solvent is a mineral oil solvent.

6. A process as defined in claim 3 wherein the amount of high boiling hydrocarbon solvent is from 3 to 5 times the amount of the hydrolysis product.

7. A process as defined in claim 3 wherein the potassium hydroxide comprises 2 to 4 percent by weight, based on (i).

8. A process as defined in claim 1 wherein a portion of the hydrolysis product of methylvinyldichlorosilane comprises sym-polymethylvinylcyclopolysiloxanes.

* * * * *

PO-1050
(5/69)

UNITED STATES PATENT OFFICE
CERTIFICATE OF CORRECTION

Patent No. 3,846,464   Dated November 5, 1974

Inventor(s) John S. Razzano

It is certified that error appears in the above-identified patent and that said Letters Patent are hereby corrected as shown below:

In Column 5, line 29, "99" should read -- 5 --.

Signed and Sealed this second Day of September 1975

[SEAL]

Attest:

RUTH C. MASON
Attesting Officer

C. MARSHALL DANN
Commissioner of Patents and Trademarks